United States Patent [19]
Hutchison et al.

[11] Patent Number: 5,855,778
[45] Date of Patent: Jan. 5, 1999

[54] FILTER PRESS

[75] Inventors: David J. Hutchison, Pickering; Alan G. Smith, Little Britain, both of Canada

[73] Assignee: William R. Perrin Ontario Ltd., Ajax, Canada

[21] Appl. No.: 908,171

[22] Filed: Aug. 7, 1997

[51] Int. Cl.⁶ .................................................. B01D 25/34
[52] U.S. Cl. .......................... 210/225; 210/229; 210/230; 210/231
[58] Field of Search ..................................... 210/224, 225, 210/227, 229, 230, 407, 409, 231; 100/198–200

[56] References Cited

U.S. PATENT DOCUMENTS

| | | |
|---|---|---|
| 3,270,887 | 9/1966 | Juhasz et al. . |
| 3,624,778 | 11/1971 | Weber . |
| 3,826,374 | 7/1974 | Busse et al. . |
| 4,105,560 | 8/1978 | Fismer . |
| 4,132,647 | 1/1979 | Sakuma . |
| 4,137,167 | 1/1979 | Kenyon et al. . |
| 4,201,672 | 5/1980 | Kenyon . |
| 4,265,749 | 5/1981 | Busse et al. . |
| 4,405,457 | 9/1983 | Busse et al. . |
| 4,511,469 | 4/1985 | Iwatani . |
| 4,591,435 | 5/1986 | Pryadkin et al. . |
| 4,668,385 | 5/1987 | Hamazaki . |
| 4,900,436 | 2/1990 | Iwatani . |
| 5,167,801 | 12/1992 | Kawasaki . |
| 5,449,468 | 9/1995 | Trümmel . |
| 5,674,384 | 10/1997 | Higgins ................................... 210/225 |

FOREIGN PATENT DOCUMENTS

| | | | |
|---|---|---|---|
| 55-124512 | 9/1980 | Japan .................................... | 210/225 |
| 61-209018 | 9/1986 | Japan .................................... | 210/224 |
| 1-207105 | 8/1989 | Japan .................................... | 210/225 |

*Primary Examiner*—Matthew O. Savage
*Attorney, Agent, or Firm*—Bereskin & Parr

[57] ABSTRACT

A filter press having a horizontal stack of filter plate assemblies, in which removal of filter cake is automated by means of a vibration/shifter carriage that can be moved in steps along a stack of filter plates after a press closing head has been retracted. At each step, the carriage opens up a group of filter plates. The plates are vibrated vertically by cams carried by the carriage. The vibrating action alternately tensions and relaxes the filter cloth for dislodging accumulated filter cake. An improved cylinder and ram arrangement for actuating the closing head is also disclosed and comprises oppositely acting cylinder and ram units carried by an intermediate travelling cylinder carriage. The arrangement achieves the advantages of a telescopic cylinder and ram unit, but at lower cost.

14 Claims, 11 Drawing Sheets

FILTER PRESS

FIELD OF THE INVENTION

This invention relates to filter presses for removing solids from liquids.

BACKGROUND OF THE INVENTION

Filter presses are well known in the art and are used, for example, for dewatering effluents and sludges from industrial and municipal waste treatment processes, or for "polishing" process fluids. A typical filter press includes a horizontal row or stack of vertical filter plates. Opposite side faces of each plate are covered with filter cloth and the faces have recesses inwardly of the cloths, or are provided with frames to define recesses. During filtration, the plates are tightly compressed together and the recesses co-operate to define filter chambers between the plates. A liquid to be filtered is fed into the chambers and passes through the filter cloths. Drainage surfaces on both faces of the plate inwardly of the filter cloths allow the filtrate to pass to draining ports which communicate with filtrate outlets from the press.

Solids in the liquid feed stream accumulate on the outer faces of the filter cloths as so-called "cakes". At the end of a filtration portion of the press cycle, the feed is stopped, the plates are separated and the cakes of accumulated solids are dislodged from the filter cloths, and fall down between the plates.

Typically, the filter plates are suspended either from overhead beams, or from side bars or rails that extend longitudinally on opposite sides of the stack of filter plates. The rails extend between fixed heads which are at opposite ends of the stack of filter plates and sufficiently spaced therefrom to allow the plates to be separated for cake removal. A hydraulic ram extends between a fixed head at one end of the press and a movable head at the adjacent end of the stack of filter plates so that the plates can be compressed between the other fixed head and the movable head by extending the hydraulic ram. It will be understood that filtration is not in fact achieved by the pressure of the hydraulic ram but by the filter cloths. The ram merely holds the stack of filter plates together during filtration and then releases the plates for cake removal.

Interesting applications for filter presses exist in the mining industry for removal of base metal solids from aqueous streams. These streams may have relatively high solids concentrations (e.g. 60–70%) which means that the filter press cycle time is short. As such, it is advantageous to reduce the time required for filter cake removal and automate press operation as far as is possible.

DESCRIPTION OF THE PRIOR ART

The United States patent literature contains numerous examples of patents relating to filter presses, including:

| | |
|---|---|
| 3,270,887 (Juhasz et al.) | 4,265,749 (Busse et al.) |
| 3,624,778 (Weber et al.) | 4,405,457 (Busse et al.) |
| 3,826,374 (Busse et al.) | 4,511,469 (Iwatani) |
| 4,105,560 (Fismer) | 4,591,435 (Pyradkin et al.) |
| 4,132,647 (Sakuma) | 4,668,385 (Hamazaki) |
| 4,137,167 (Kenyon et al.) | 4,900,436 (Iwatani) |
| 4,201,672 (Kenyon) | 5,167,801 (Kawaski) |
| 5,449,468 (Trümmel) | |

Several of the patents show arrangements for shifting the filter plates of a filter press during the cake removal cycle, so that the plates can be opened and cleaned. Patents in this category include Busse, et al. (U.S. Pat. No. 3,826,374), Sakuma (U.S. Pat. No. 4,132,647), Fismer (U.S. Pat. No. 4,105,506) and Juhasz et al. (U.S. Pat. No. 3,270,887).

Of particular interest in the context of cake removal from the filter cloth are Kawasaki (U.S. Pat. No. 5,167,801), Kenyon et al. (U.S. Pat. No. 4,137,167), Iwatani (U.S. Pat. No. 4,900,436) and Trummel (U.S. Pat. No. 5,449,468).

SUMMARY OF THE INVENTION

An object of the present invention is to provide various improvements in filter presses that can be used individually or in combination with a view to improving efficiency and facilitating automation of the filter press cycle.

In accordance with a first aspect of the invention there is provided a filter press which includes a frame having first and second end members and a pair of generally horizontal side rails extending between the end members. A series of filter plates is supported generally vertically on the side rails for movement between filtering positions in which the plates are compressed together as a pack and positions in which at least some of the plates are separated for removal of filter cake. In the filtering positions, the filter plates define filter chambers between the plates. The press also includes inlet means for delivering to the filter chambers a liquid stream to be filtered, and filtrate outlet means. Press closure means is provided for maintaining the filter plates in the filtering positions, and for releasing the plates for movement to their separated positions for removal of filter cake. Each filter plate is generally planar, has opposite side faces and top and bottom ends, and forms part of a filter plate assembly further comprising a bar disposed generally in the plane of the filter plate and spaced away from one of the top and bottom ends. The plate is vertically displaceable towards the bar and is biassed away from the bar towards a rest position. Respective filter cloths extend over the side faces of the filter plate and each cloth has a first end coupled to the bar and a second end coupled to the plate. The cloths are under normal tension when the filter plate is in its rest position so that movement of the filter plate towards the bar relaxes the tension in the filter cloths, while movement of the plate in the opposite direction restores the tension. The press also includes means for simultaneously and repeatedly displacing the filter plates of at least a group of the filter plate assemblies towards the respective bars of the filter plate assemblies and allowing the plates to return under the effect of said biassing, for dislodging filter cake.

In summary, the filter plates are compressed together as a pack during filtering, as is normal with a conventional filter press. When filter cake is to be removed from the filter cloths, the plates are released and at least a group of the plates is separated from the remainder of the pack and the plates in the group are separated from one another. The filter plates of that group are then all simultaneously displaced towards and away from the respective bars of the filter plate assemblies, repeatedly relaxing and restoring the tension in the filter cloths of those assemblies, thereby encouraging dislodgement of the filter cake from the filter cloths. In effect, the filter plates themselves vibrate, which further encourages dislodgement of filter cake.

The means for displacing the filter plates towards the bars preferably is designed to abruptly release the filter plates for return movement under the influence of the biassing, so that there is some impact or shock as well as shear effect to further assist dislodgement of filter cake. While gravity may be relied on for biassing, in a preferred embodiment, the bar of each filter plate assembly is disposed above the top edge of the filter plate and compression springs are used between the bar and the plate as biassing means maintaining the plate in its rest position. The plate can then be lifted by a cam arrangement acting on a follower that projects laterally from the plate. The cam can be profiled and the follower will abruptly "fall off" the peak of the cam so that the filter plate will abruptly return to its rest position under the influence of the compression springs, creating a shock impact.

As will be described in more detail later, the filter plate assemblies preferably are separated in groups from the remainder of the "pack" of filter plates and the plates in the group are separated from one another and cleaned of filter cake before the next group of plates is dealt with. This can be accomplished be means of a carriage that moves progressively along the row of filter plates. Movement of the carriage can be used to "open up" successive groups of plates, vibrate and thereby clean filter cake from the filter cloths in that group and then move onto the next group in the pack. The carriage can incorporate wash headers for flushing the filter cloths.

In this way, it is possible to substantially completely automate the operation of filter cake removal from all of the filter plates in the press and to accomplish the cleaning process quickly and efficiently.

According to another aspect of the invention, there is provided a filter press including a frame having first and second end members and a pair of generally horizontal side rails extending between the end members in horizontally spaced positions. A series of filter plates is supported on and between the side rails in generally vertical positions for movement between filtering positions in which the plates are compressed together as a pack, and positions in which at least some of the plates are separated from the remainder of the plates for removal of filter cake from the separated plates. The filter plates define filter chambers therebetween in which filter cake accumulates in use. Inlet means is provided for delivering to the chambers a feed solution to be filtered and the press also includes filtrate outlet means from the chambers. Press closure means is provided for maintaining the filter plates in the filtering positions during filtration and is releasable to permit at least some of the plates to be separated for cake removal. The closure means includes a closing head supported between the side rails of the frame for movement towards and away from the series of filter plates for compressing the plates against a first one of the frame end members. An intermediate carriage is supported between the side rails for movement between a second one of the frame end members and the closing head and first and second ram and cylinder units are coupled, one between the intermediate carriage and the closing head and the other between the intermediate carriage and the second frame end member, for accomplishing extended travel of the carriage with respect to the second end member.

By using two ram and cylinder units or assemblies of such units in this way, it is possible to give the closing head a relatively long stroke, without the use of expensive telescoping cylinder and ram units. A long stroke is important for allowing adequate spacing between the filter plates as they are separated for cleaning.

BRIEF DESCRIPTION OF DRAWINGS

In order that the invention may be more clearly understood and readily carried into practice, reference will now be made to the accompanying drawings which illustrate a particular preferred embodiment of the invention by way of example, and in which:

FIG. 6 is an elevational view from the right in FIG. 6;

FIGS. 6(a) and (b) are enlarged views of the portions of FIG. 6 that are circled at "A" and "B" respectively;

DESCRIPTION OF PREFERRED EMBODIMENT

Figure 1:
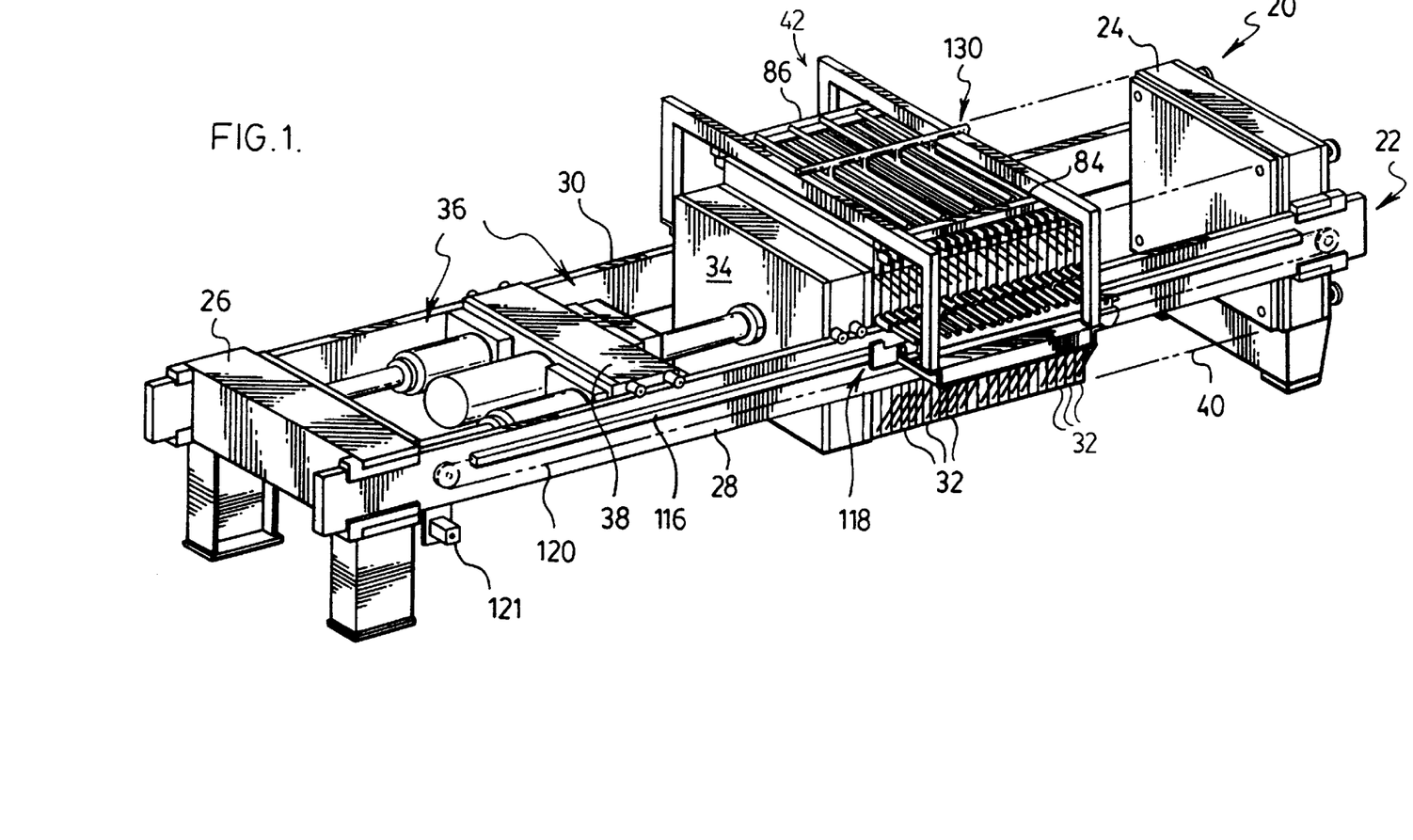
FIG. 1 is an overall perspective view of a filter press in accordance with a preferred embodiment of the invention.

Referring first to FIG. 1, a filter press is generally denoted by reference numeral 20 and has a frame 22 which includes first and second end members 24 and 26 known respectively as a "feed head" (24) and a "end stand" (26). A pair of spaced, generally horizontal side bars or rails 28, 30 extend between the end members 24, 26.

Supported on the side rails 28, 30 are a series of vertically oriented filter plates 32. During filtration, the filter plates 32 are compressed together as a pack against the feed head 24 by a closing head 34 that is also supported for movement along the rails 28, 30. Closing head 34 can be advanced and retracted with respect to the end stand 26 by cylinder and ram assemblies generally indicated at 36, the cylinders of which are supported on a travelling cylinder carriage 38. Details of the cylinder and ram assemblies will be described later with reference to FIGS. 10 and 11.

For present purposes, it is sufficient to note that, as seen in FIG. 1, the closing head 34 is in an advanced position in which the pack of filter plates 32 is tightly compressed against the feed head 24. FIG. 1 does not show all of the filter plates in the pack in full lines; the ghost outline indicated at 40 is intended to show that the pack of filter plates fills the space between the closing head 34 and the feed head 24. When the closing head is retracted, sufficient "daylight" is present between the head and the stack of filter plates to permit the plates to be separated in groups for cleaning.

Figure 3:
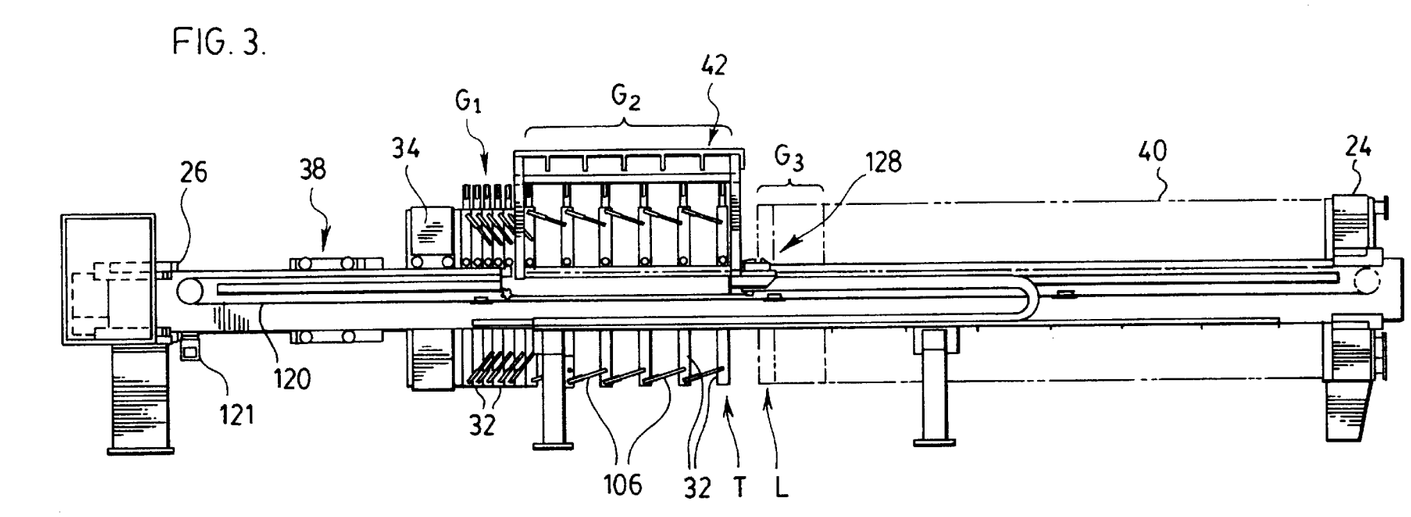
FIG. 3 is a side elevational view corresponding to FIG. 1, but with some of the filter plates shown separated for cleaning.

Reference numeral 42 generally denotes a carriage that is also supported on the side rails 28, 30 of frame 22 for movement along the rails. As will be described in more detail later, carriage 42 is designed to automatically separate groups of the filter plates 32 from the pack during the cleaning portion of the cycle of the filter press. Carriage 42 also includes a mechanism for vibrating the filter plates to assist in dislodging accumulated filter cake. For example, FIG. 3 shows carriage 42 at an intermediate position along the stack of filter plates in which a group (G2) of the filter plates "embraced" by carriage 42 have been separated for cleaning. Groups G1 and G3 of filter plates on opposite sides of the carriage essentially remain closed up together, though not under compression.

Figure 4:
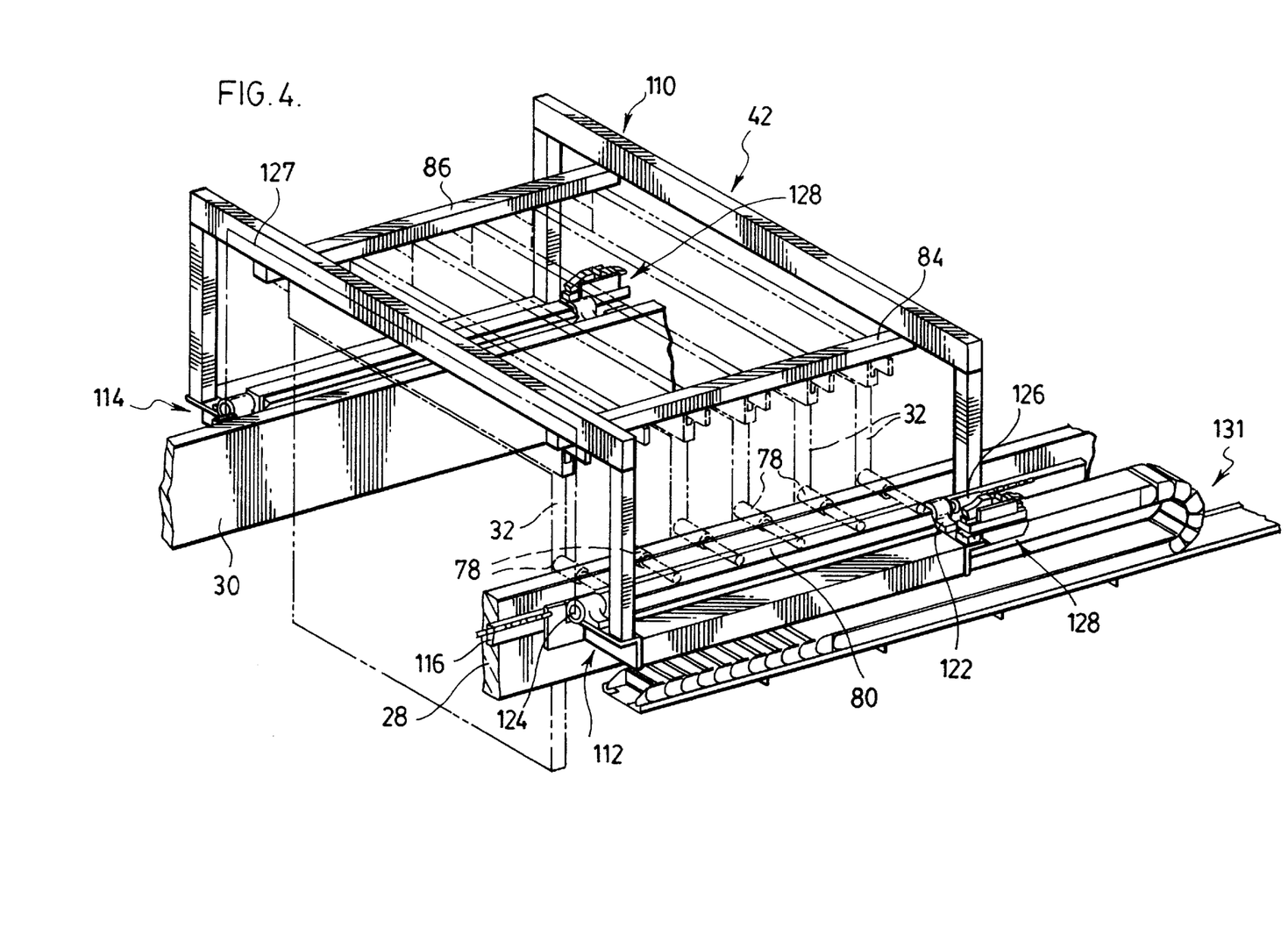
FIG. 4 is an enlarged perspective view of part of FIG. 1.

In summary, FIG. 1 shows the filter press with the filter plates compressed together, as during the filtering portion of the press cycle, whereas FIGS. 3 and 4 show some of the plates as having been separated as during the cleaning portion of the press cycle. During filtration, carriage 42 will normally be in a "park" position to the left of the position shown in FIG. 1.

Figure 2:
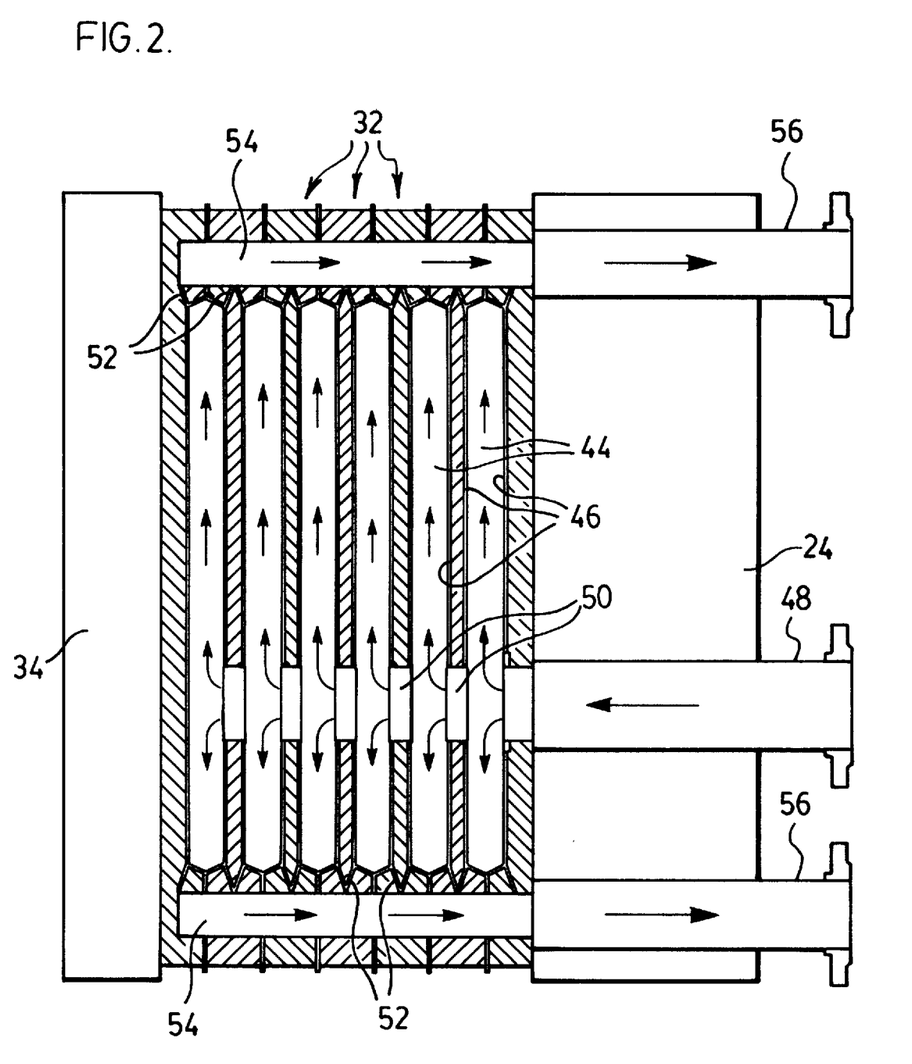
FIG. 2 is a schematic vertical sectional view through a compressed pack of filter plates to illustrate liquid flow through the pack.

FIG. 2 is a schematic view designed to illustrate the basic principle of operation of a filter press such as the press to which the invention relates. As seen in FIG. 2, a series of filter plates 32 are shown compressed against a feed head 24 by a closing head 34. For the sake of illustration, only six filter plates are shown although it will be appreciated from the other views that a much larger number of filter plates typically will be used.

It can be seen from FIG. 2 that the filter plates are essentially planar. Except for the endmost plates, each of the plates 32 has opposite side faces that are recessed so that the recesses of adjacent plates co-operate to define filter chambers 44 when the plates are in abutment. Respective filter cloths 46 cover both side faces of the plate and in effect "line" the walls of the chambers 44 when the filter press is in use.

Inlet means for delivering a liquid stream to the chambers 44 is provided by a tubular inlet 48 through feed head 24. The filter plates 32 are provided with respective inlet openings 50 that align with the main inlet 48 when the filter plates are compressed against the feed head 24. Each inlet 50 is known as a "feed eye". The filter cloth at opposite faces of the filter plate is joined by an impervious sleeve known as a "barrel neck".

The recessed faces of the filter plates are profiled to define drainage surfaces (not specifically illustrated) in the form of ribs, grooves or "pips" behind the cloth to allow filtrate to drain through drainage ports 52 to openings 54 called "corner eyes" located in each corner of the plate (only two visible). These "eyes" in turn connect to corresponding filtrate outlets 56 through feed head 24.

It will be appreciated from FIG. 2 that, as liquid flows from inlet 48 to the outlets 56 along the path indicated by the arrows in FIG. 2, solids in the liquid stream will be filtered from the stream by the filter cloths and will build up as "cake" on the filter cloths within chambers 44. The filtering portion of the cycle will proceed until cake build-up reaches a point at which the plates must be cleaned. The closing head 34 (FIG. 1) is then retracted so that the plates can be moved apart and filter cake dislodged from the filter cloths.

Figure 5:
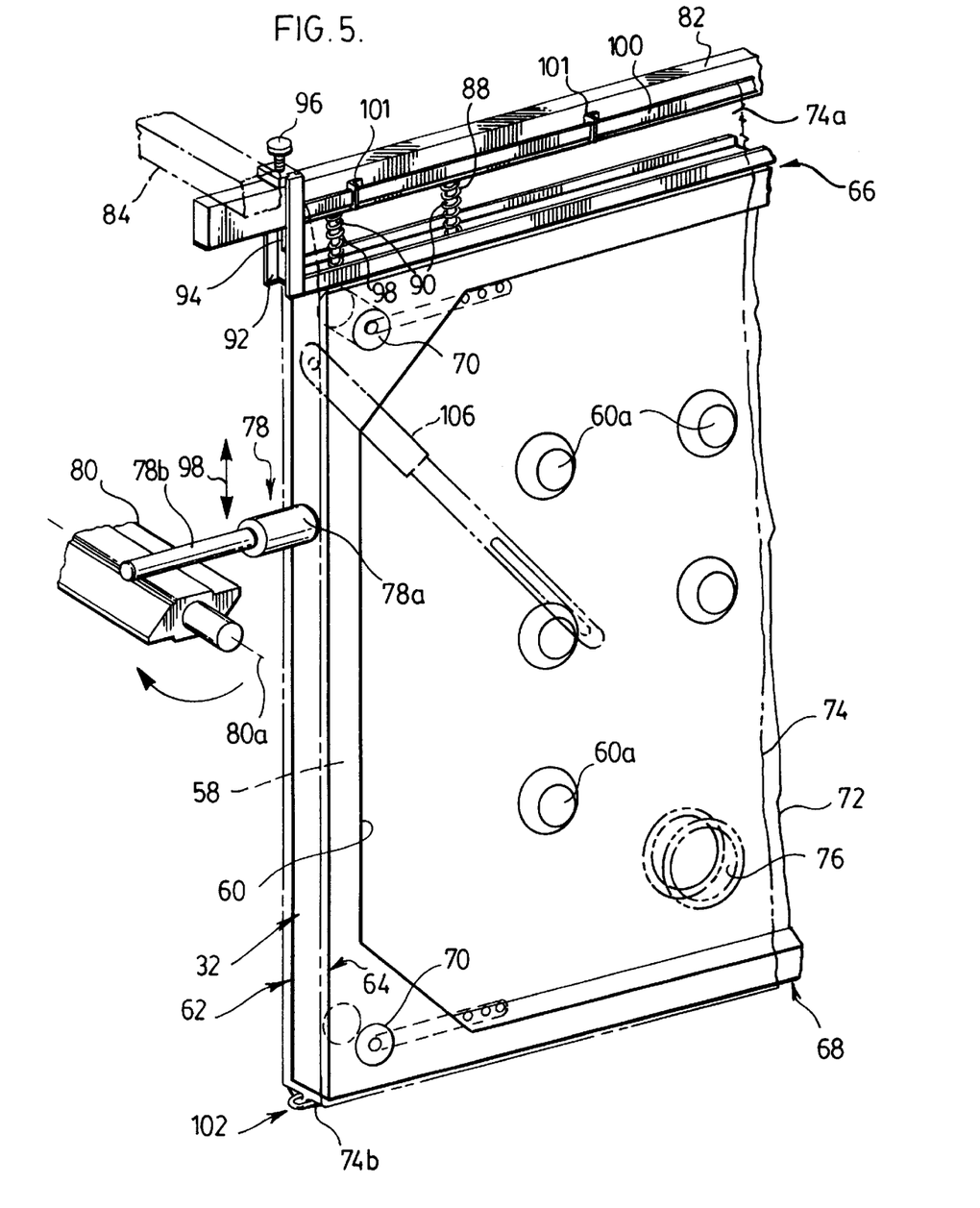
FIG. 5 is a partial perspective view of one of the filter plate assemblies of the filter press.
Figures 6, 6A, 6B:
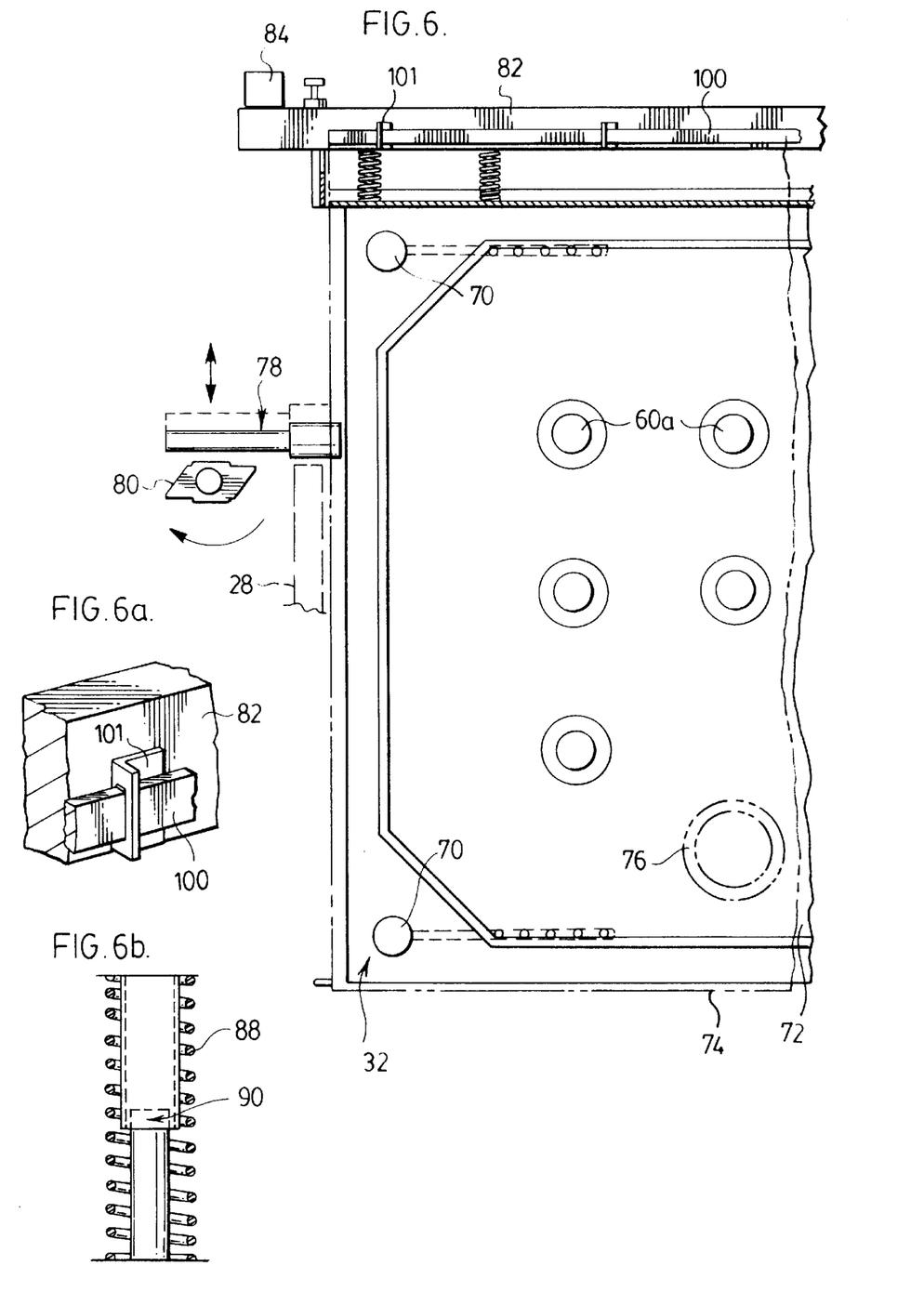
Figure 7:
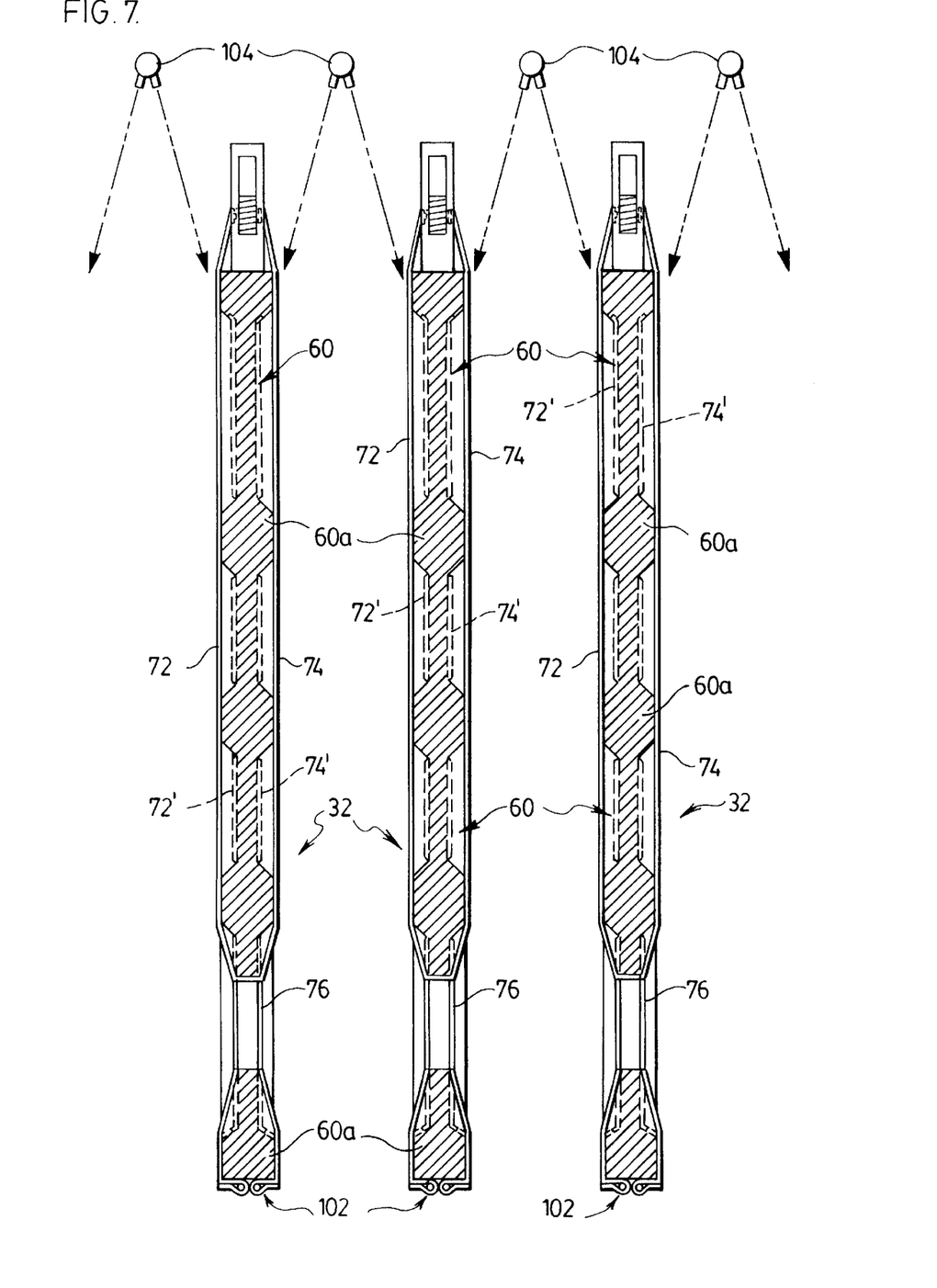
FIG. 7 is a view somewhat similar to FIG. 2 but showing three filter plate assemblies of the particular form provided by the invention, separated from one another for removal of filter cake.

It is to be understood that the description with reference to FIG. 2 is given for the purpose of explaining the general principles of operation of a filter press and that FIG. 2 is merely a schematic illustration. FIGS. 5, 6 and 7 show filter plates of the form provided by the present invention. It will be seen from those views that each filter plate 32 is rectangular and essentially comprises a generally planar rectangular frame 58 surrounding recessed areas at both sides of the plate. One of those areas is visible at 60 in FIGS. 5 and 6 and includes a number of "structural bosses" 60a. The filter plate has opposite side faces 62 and 64 and top and bottom ends 66 and 68. Two of the four filtrate outlet eyes referred to previously in connection with FIG. 2 are indicated at 70. Respective filter cloths 72 and 74 extend over the side faces 62, 64 of the filter plate 32. A "barrel neck" extending between the two filter cloths is shown at 76 and forms a feed eye as described previously in connection with FIG. 2.

All of the filter plates 32 of the press are supported on the side rails 28, 30 (see FIG. 1) of the press frame for movement between filtering positions in which the plates are compressed together as a pack and positions in which at least some of the plates are separated from the remainder of the plates for cleaning. The filter plates have respective cylindrical bars or handles that project from opposite side edges of the plate and ride on the rails 28, 30. One of these handles is shown at 78 in FIGS. 5 and 6 and a second similar handle projects from the opposite side edge of the filter plate. Each handle has inner and outer portions 78a and 78b, of which the inner portion 78a is of larger diameter than the outer portion. This portion rests on the relevant press frame side rail, e.g. rail 28 as indicated in ghost outline in FIG. 6. The outer portion 78b co-operates with a bar or cam 80 of carriage 42 (FIG. 1) when the plates have been separated for cleaning.

When the filter plates are compressed together during the filtering portion of the press cycle, the recesses (as recess 60) co-operate to define filter chambers between the plates. The recessed surfaces are profiled (not shown) to provide drainage areas behind the filter cloths leading to the corner eyes 70, all generally as previously described. The structural bosses 60a co-operate to ensure structural rigidity for the pack of filter plates when they are compressed together for filtering.

At the start of the cleaning portion of the press cycle, closing head 34 is retracted. The filter plates can then be separated.

In accordance with the invention, the filter plates are then vibrated vertically for cake removal. Thus, each filter plate 32 forms part of a filter plate assembly that includes a stop bar 82 (see FIGS. 5 and 6) that is disposed generally in the plane of filter plate 32 and spaced from either the top end or the bottom end of the plate (in the illustrated embodiment—the top end). Bar 82 bears against the underside of a pair of frame members of the vibration/shifter carriage 42 referred to previously in connection with FIG. 1. The two frame members in question are indicated at 84 and 86 in FIG. 1. In this context, it will be appreciated that bar 82 extends over the full width and slightly beyond both ends of the filter plate 32 and that the end of the filter plate assembly not shown in FIGS. 5 and 6 is essentially a mirror image of the end shown. Accordingly, stop bar 82 is prevented from moving upwardly at both ends by the two frame members 84, 86. At the same time, the bar can move with the filter plates longitudinally with respect to the frame members 84, 86 when the filter plate is moved along the side rails 28, 30 of the press frame.

As will be described in detail later, the shifter carriage 42 moves along the stack of filter plates and progressively opens the plates in groups for cleaning. Accordingly, the frame members 84, 86 of carriage 42 restrain only the stop bars 82 of those filter plates that are "embraced" by the carriage at the time. However, it is only those plates that are vibrated for cleaning, as will become apparent.

Reverting to FIGS. 5 and 6, filter plate 32 is vertically displaceable towards the stop bar 82 (i.e. in the upward direction) by rotation of cam 80. As can be seen, the profile of the cam is essentially a parallelogram shape in cross-section and the cam extends about an axis 80a (FIG. 5). Accordingly, as cam 80 rotates (together with a similar cam at the opposite side of the group of filter plates), plate 32 is repeatedly lifted by contact of the cams with the handles 78 of the filter plate; the profile of the cam causes each handle to be lifted and then allowed to fall back into contact with the side rails 28 and 30 twice per revolution of the cam.

The filter plate is biassed downwardly by a series of compression springs between the top end face of the filter plate and stop bar 82. Two of those springs are visible in FIGS. 5 and 6 and are denoted 88. Each spring is located by a pin 90 around which the spring extends. As can be seen from FIG. 6b, the two pins are in fact telescopic and alternately compress and expand as the plate vibrates. Stop bar 82 is coupled to the plate 32 by respective brackets at each end, one of which is visible at 92, and a similar one of which is provided at the other end of the filter plate. It will be seen that the stop bar 82 extends through a vertically elongated opening 94 in bracket 92, which allows the required vertical movement of plate 32 with respect to bar 82. Adjustment screws 96 extend through the top of bracket 92 and its companion (not shown) and bear against the top of bar 82, for allowing limited relative adjustment between the stop bar 82 and the plate 32.

FIGS. 5 and 6 show the normal "rest" position of the filter plate 32 with respect to stop bar 82. As the two cams (80) rotate, plate 32 will be repeatedly displaced towards bar 82 and then returned under the influence of the compression springs 88, as indicated by arrow 98. While it might be possible to rely on gravity to return the filter plate in the downward direction, the compression springs 88 have the effect of driving the plate down as the handles "leave" the peaks of the cams, so that there is an impact between the two handles 78 and the side rails 28 and 30; this impact effect further assists in dislodging accumulated filter cake from the filter cloths, 72, 74.

The cloths themselves are repeatedly placed under tension and relaxed as mentioned previously. Referring to cloth 74 by way of example, the cloth has a first or upper end 74a which is retained on stop bar 82, and a second or lower end 74b which is coupled to the bottom end face of filter plate 32. In the rest position of the filter plate as shown, the cloth is under normal tension. As the plate moves up with respect to bar 82, the tension in the cloth will be relaxed, but as the filter plate moves down again, the tension will be restored. This repeated tensioning and relaxation of the filter cloth coupled with the vibratory effect mentioned above has been found to be very effective in dislodging accumulated filter cake.

The upper marginal edge of each filter cloth 72, 74 (as the marginal portion at the upper end 74a of cloth 74) is sewn into the form of a sleeve that receives a cloth retention member or bar 100 located in brackets 101 on stop bar 82. A similar sleeve at the lower end of each filter cloth (e.g. end 74b of cloth 74) receives a so-called hairpin rod 102 that retains the lower margins of both filter cloths. Rod 102 is essentially U-shaped with very long limbs that are received in the sleeves in the respective filter cloths.

FIG. 7 shows two adjacent filter plates 32, separated as for cleaning and illustrates the fact that the filter cloths 72, 74 on the respective faces of both plates are then tensioned so that they tend to lie in parallel planes containing the outer faces of the plates. During filtering, the cloths 72, 74 are forced into the recesses 60 and in effect adopt their shape, as indicated in dotted lines at 72' and 74'. FIG. 7 also shows water spray nozzles that are carried by the vibration/shifter carriage 42 for flood washing of the filter cloths. These water spray nozzles are individually denoted 104 in FIG. 7. Filter cake that has been dislodged is of course removed from below the filter press before flood washing.

FIG. 3 shows the filter press as it appears during the cleaning portion of the press cycle, with the closing head 34 retracted and a group of filter plates separated or "opened" for cleaning. Carriage 42 progressively moves in steps along the entire stack of filter plates in the press, successively separating the plates in each group, cleaning those plates by the vibration technique described previously, and flood washing if appropriate, and then re-closing the group of plates. When the final group of plates has been opened and cleaned, carriage 42 returns to a rest or "park" position to the left of the closing head as seen in FIGS. 1 and 3, and the closing head is actuated to compress the pack of filter plates, beginning the next filtering cycle of the press.

FIG. 1 shows the vibration/shifter carriage 42 positioned over several groups of filter plates adjacent closing head 34 with the filter plates in closed (compressed) positions. FIG. 3 shows carriage 42 in a position part way through the cleaning cycle. A first group G1 of filter plates has been opened, cleaned and closed again and the carriage is shown located above a second group of plates G2 in which the plates have been separated from one another for cleaning. It will be seen from FIG. 3 that the filter plates in the press are in fact interconnected by pivoted links 106, two at each side of each plate, so that the filter plates in a group can be separated from one another by displacing the "leading" filter plate in the group through an appropriate distance along the side rails 28, 30 of the press frame. One of these links 106 is visible in FIG. 5 and it will be seen that the link has a plain pivot opening 106a at one end, and a slot 106b adjacent its opposite end. As shown, link 106 is pivotally coupled to plate 32 through opening, 106a by means of a pivot pin (not shown). A similar pivot pin (also not shown) will extend through the slot 106b and couple the link to the immediately adjacent plate. Of course, the links 106 and the slots 106b are appropriately dimensioned and located to allow adjacent filter plates to move from positions in which they are in abutment with one another, to positions in which they are separated by a pre-determined amount sufficient to permit cleaning of the filter cloths.

Carriage 42 includes so-called "shifter mechanisms" at both sides for opening the groups of filter plates, and is best illustrated in FIG. 4 of the drawings, which will now be described.

It will be seen that carriage 42 includes a frame 110 which is generally of inverted U-shape and which embraces or extends over the filter plates and is carried by the side rails 28, 30 of the filter press frame. Carriage frame 110 includes the bars 84 and 86 referred to previously in connection with FIGS. 5 and 6.

Outwardly of the main press frame side rails 28 and 30, carriage frame 110 includes respective brackets 112 and 114 that extend inwardly and by which the carriage 42 is supported for longitudinal movement on the side rails 28, 30. The brackets 112, 114 carry wheels that run on rails or tracks on the outer surfaces of the main press side rails 28, 30. Referring to FIG. 1, the track on rail 28 is indicated at 116. Wheels on carriage 42 that engage 116 are not specifically shown but are located at opposite ends of the carriage 42; one of those locations is indicated at 118. Chain drives are provided at both sides of the press for indexing carriage 42 along the press side rails 28, 30 in accordance with a regime to be described. An endless chain of the chain drive at the near side of the press in FIG. 1 is indicated at 120 and parallels the track 116 on which the carriage rides. A hydraulic drive motor 121 is provided for chain 120. A similar chain drive is provided at the opposite side of the press and is driven from motor 121 by a cross-shaft (not shown). In fact, it should be noted that all of the components to be described as being provided at the near side of carriage 42 as seen in FIGS. 1 and 3 are duplicated at the far side but will not be described separately.

Referring to FIG. 4, filter plate handles 78 can be seen projecting from the ends of the plates and across the vibrator bar or cam 80 described in connection with FIGS. 5 and 6. Cam 80 has journals at its ends that are rotationally supported in respective bearings shown at 122 and 124 in FIG. 4. A hydraulic drive motor for the bar is indicated at 126. The corresponding cam (not shown) at the opposite side of the carriage is driven from cam 80 in synchronism by a chain drive which follows the inverted U-shape of the frame of carriage 42 and which is generally indicated at 127 in FIG. 4.

Carriage 42 also carries, at each side, a "shifter mechanism" 128 for engaging the handles 78 of a leading filter plate in each group of filter plates to be opened. After the handles at both sides of that plate have been engaged, carriage 42 is moved through the appropriate incremental amount to longitudinally displace that filter plate, pulling with it successive plates in the group a result of the links 106 referred to previously. The shifter mechanism is shown in detail in FIGS. 8 and 9. Before referring to those views, it should just be noted that carriage 42 also carries conventional flood washing equipment for the filter plates; though not shown in FIG. 4, a typical wash header is shown at 130 in FIG. 1. A conventional flexible cable/hose carrier denoted 131 in FIG. 4 is provided at one side for water and hydraulic hoses and power supplies to the various components of carriage 42.

In the particular embodiment described, carriage 42 moves from left to right along the stack of filter plates as the filter press is shown in the drawings. The plates are opened in groups as described previously, by engagement of the shifter mechanism 128 with the handle 78 of the leading plate in each group (and engagement of the corresponding shifter mechanism at the other side of the carriage 42). For the purpose of this description, the "leading" filter plate is considered to be the plate at the extreme left-hand end of the group, i.e. the first plate which is reached by the carriage. Referring to FIG. 3, the first group (G1) has already been opened and closed and the second group of six plates (G2) has been opened. Shifter mechanism 128 is shown in engagement with the "leading" plate in the next group (G3) namely the extreme left-hand plate of that group, denoted L. Mechanism 128 is now ready to open group G3 and close group G2. The last or "trailing" plate in group G2 is denoted T.

Figure 8:
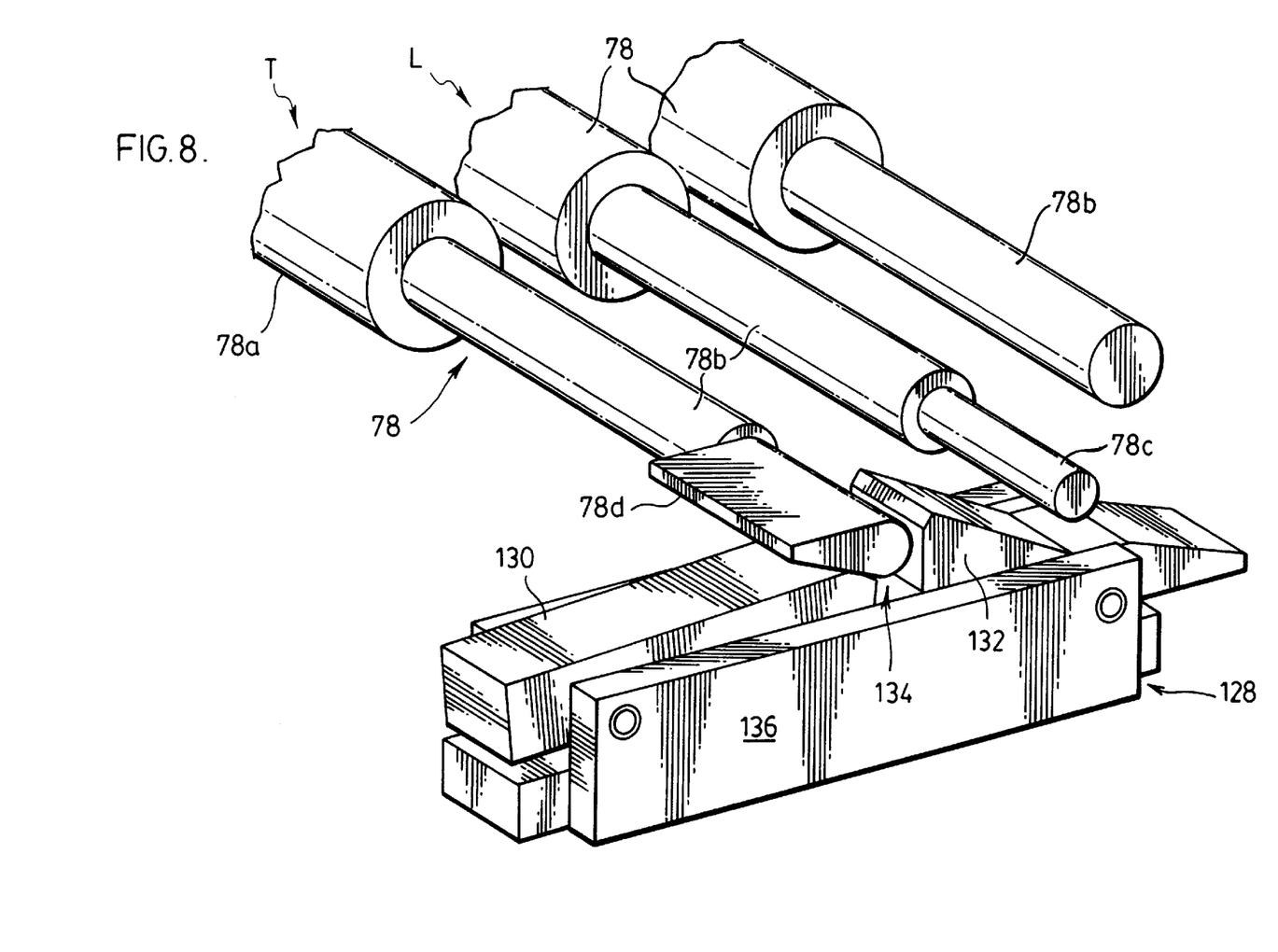
FIG. 8 is a detail view of part of a latch shifter mechanism that is visible in FIG. 5.
Figure 9:
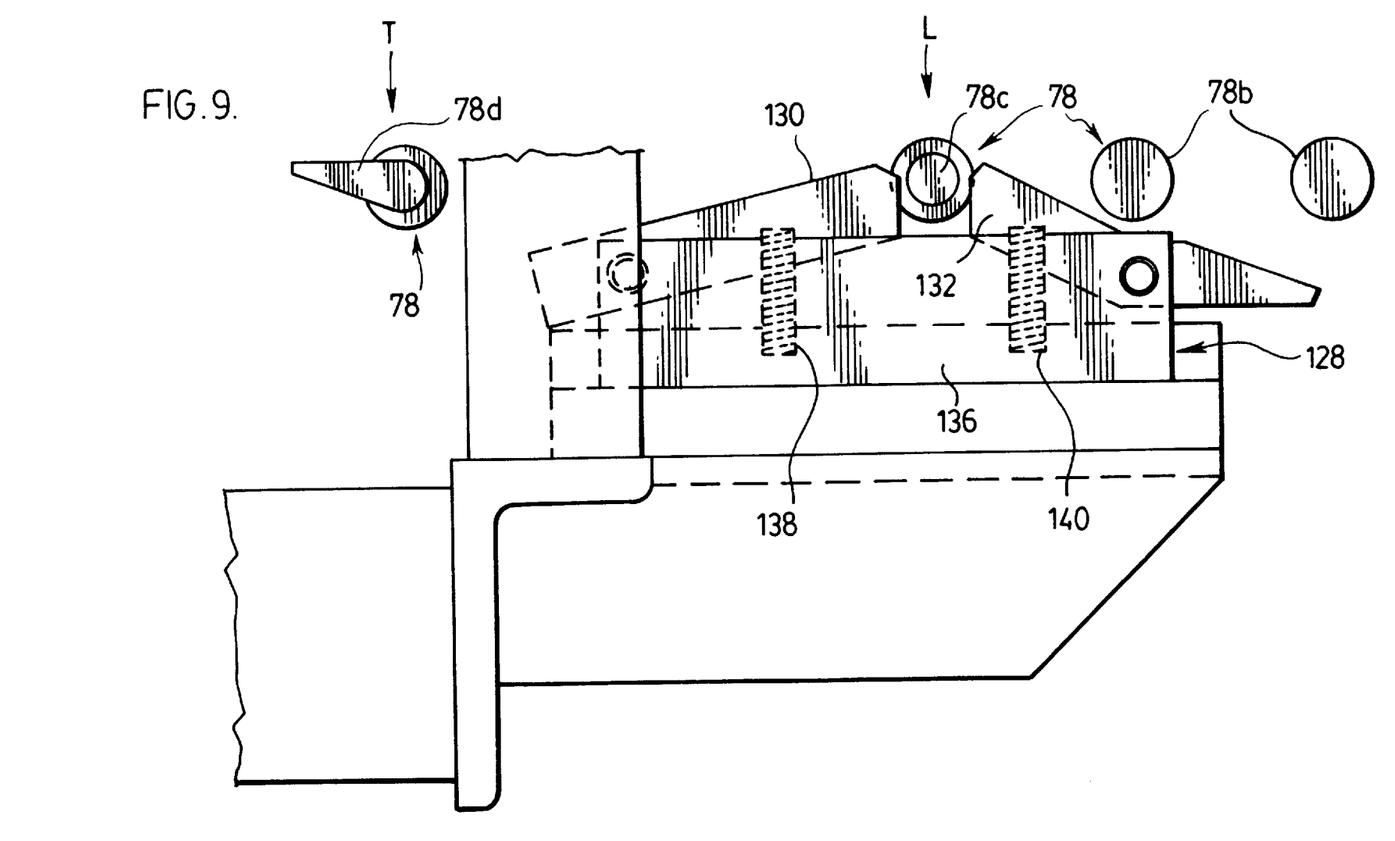
FIG. 9 is an elevational view corresponding to FIG. 8.

In FIG. 9, one of the handles 78 of that "leading plate" L (e.g. of group G3) is shown in engagement with the shifter mechanism 128, while in FIG. 8 the handle of trailing plate T (e.g. of group G2) is shown in engagement with mechanism 128. It will be seen that the handle of plate L has an axial extension 78c beyond the outer end of the standard handle portion 78b referred to in connection with FIGS. 5 and 6. Since the plates are to be opened in groups of six, every sixth plate is considered to be a "leading" plate and has this extension. This means that the shifter mechanism 128 (and the corresponding mechanism at the other side of the press) will engage only every sixth plate. The last or "trailing" plate T in each group is provided with a cam 78d shaped to release mechanism 128 at the appropriate time, while preventing the mechanism engaging that handle.

Mechanism 128 has two latch members 130, 132 which are angled upwardly towards the centre region of the shifter mechanism and spaced to define a "pocket" 134 for receiving handle portion 78c. The two latches 130, 132 are pivoted transversely (i.e. parallel to the axes of the handle 78) to a base structure 136 of the shifter mechanism, adjacent the outer ends of the latch members. The members are biassed upwardly at their respective inner ends by compression springs 138, 140 best seen in FIG. 9. Thus, as carriage 42 is traversed to the right towards the position shown in FIG. 8, with the filter plates in its path stationary, handle cam 78d of trailing plate L will first depress latch 132 and then "ride over" and depress latch 130. Next, handle portion 78c will depress latch member 132. Once the latch member 132 has passed below the handle portion, it will return to the handle engaging position shown under the influence of spring 140. Handle 78 will then abut against but not depress latch 130, so that the handle is in effect "locked" to carriage 42 (at both sides).

As noted previously, at the beginning of the cleaning portion of the cycle of the filter, the vibration/shifter carriage 42 is a "park" position to the left of the closing head 34 in FIG. 3. The carriage is then first moved towards the feed head 24 by the chain drives including chain 120, until the filter plate shifter mechanism 128 (both sides) lock onto the handles of the first filter plate (the leading plate in group G1). A hydraulic pressure switch (not shown) is then activated, reversing the carriage travel. The first six plates (which are coupled together by the links 106) are pulled by the carriage towards the closing head 34 (which is retracted at this point), separating the plates in that group by means of the links, to a set distance apart. A stop (not shown) on head 34 depresses the latch member 130 of mechanism 128 at this time.

An hydraulic pressure switch then reverses the hydraulic motor (121) driving the chain drives to return the carriage until the plate shifter locks onto the handles 78 of the first plate in the next group of plates. At this point, the carriage remains stationary for a predetermined period of time and hydraulic motor 126 (FIG. 4) is actuated to vibrate the plates of group G1 as described previously.

When the vibration portion of the cycle has been completed, flood washing of the filter cloth can be activated. This completes the cleaning sequence for the first six plates.

The chain drives for carriage 42 now activate, moving the carriage to the left and opening the second group of plates (G2), while simultaneously closing up the first group (G1). The handle cam 78d of the trailing plate T of group G1 depresses latch member 130 at this time (FIG. 8) so that the carriage can move to the right. The carriage then engages the leading handle in the third group (G3) and stops. This is the position shown in FIG. 3. The second group can be now cleaned. This procedure is repeated until all of the filter plates, in groups of six, have been shifted, vibrated and washed. The carriage 42 then returns to its "park" position at the left-hand end of the filter frame as shown.

The filter press of course includes appropriate process control equipment for causing these sequences to take place on an automatic basis. However, the process control equipment is essentially conventional and does not form part of the present invention. Accordingly, it has not been described in detail.

Figure 10:
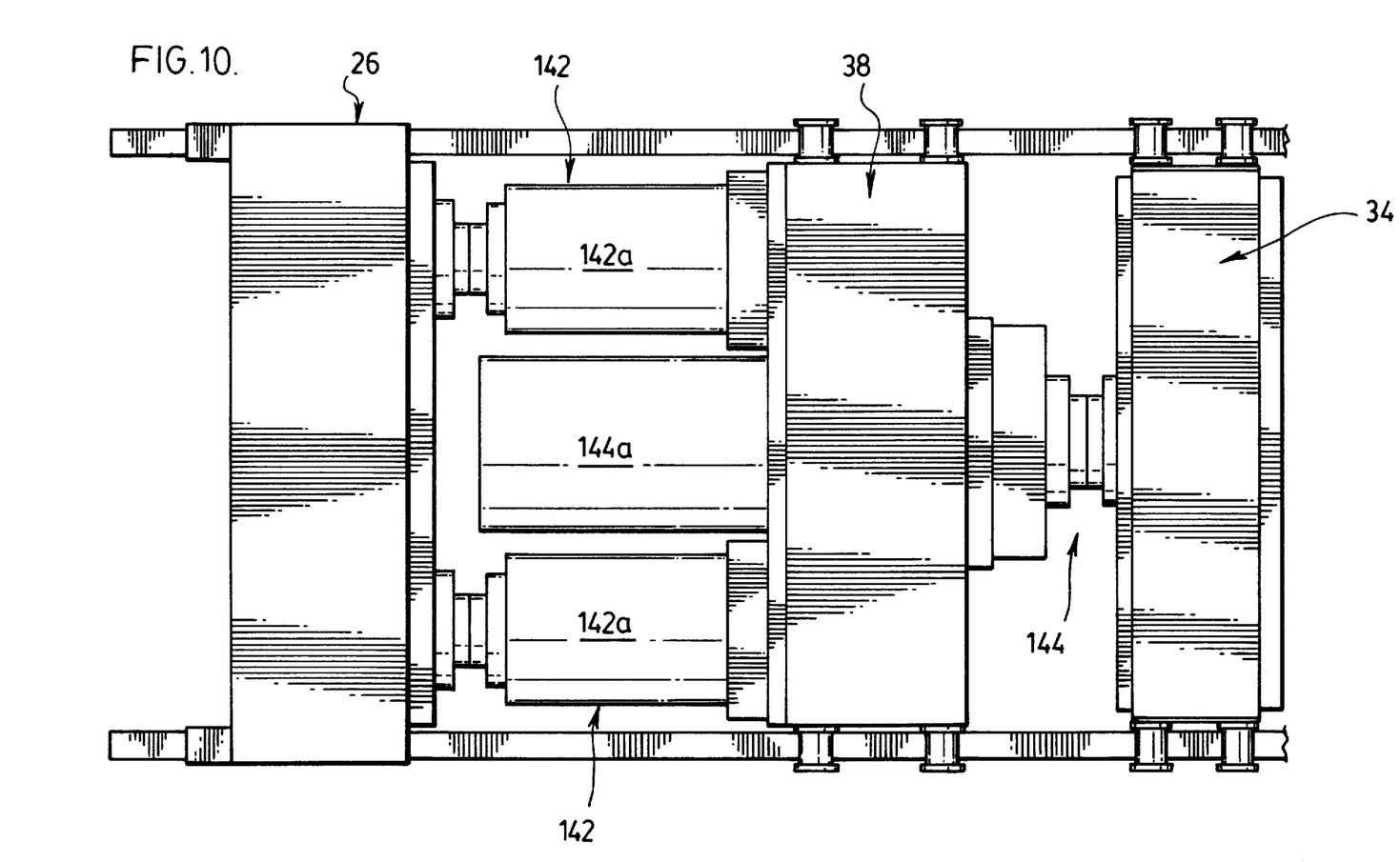
FIGS. 10 and 11 are plan views of the actuating cylinder and ram assemblies of the filter press, shown respectively in a retracted position and an extended position.
Figure 11:
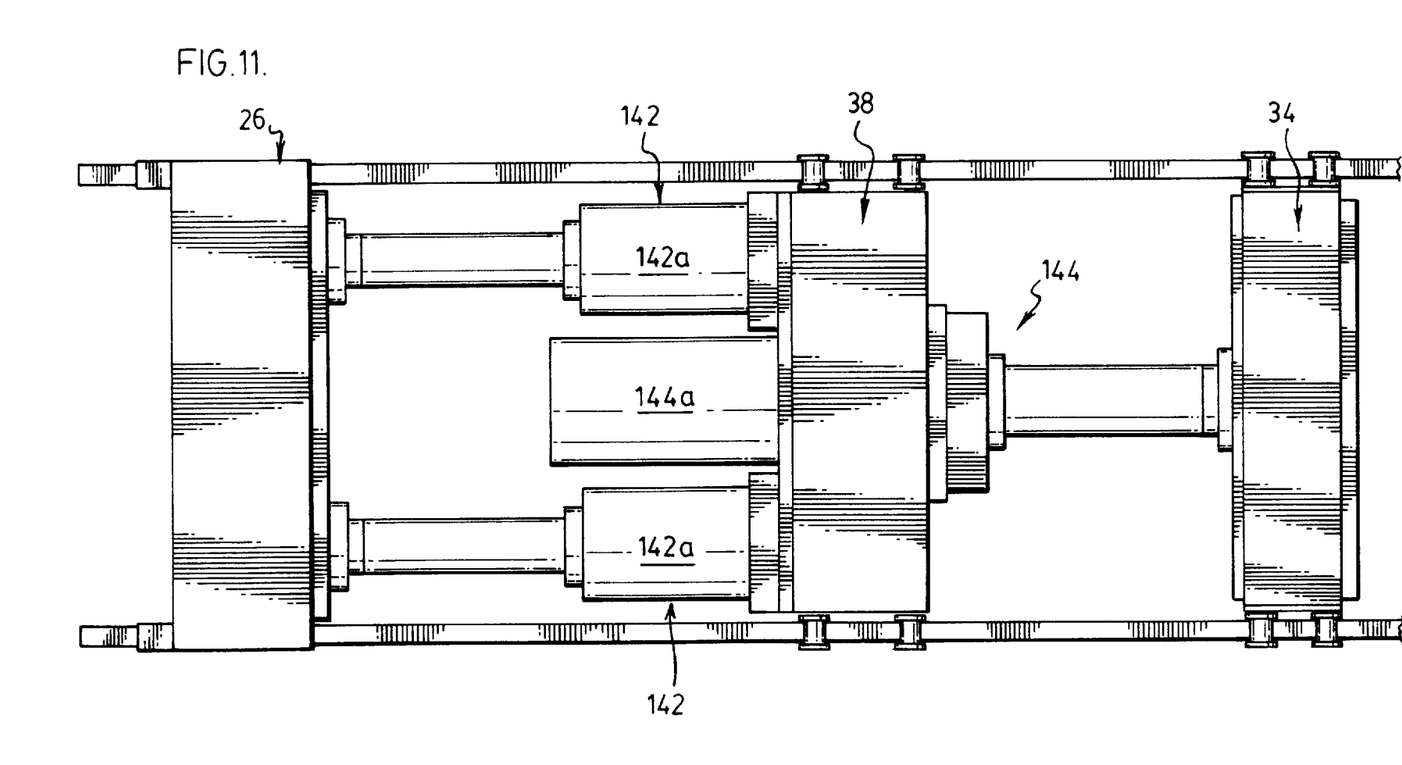

Finally, FIGS. 10 and 11 show in plan, the hydraulic cylinder and ram arrangement of FIG. 1 respectively in the retracted and extended positions, as seen in plan. The views show only the portion of FIG. 1 up to closing head 34. Also seen is the end stand 26 and the intermediate carriage 38. The cylinder and ram arrangement 36, forming the press closure means of the filter press includes first and second cylinder and ram units, one coupled between the intermediate carriage 38 and the closing head 34, and the other between the intermediate carriage 38 and the end stand 26. While it would be feasible to use a single cylinder and ram unit between carriage 38 and end stand 26, in the illustrated embodiment, two identical cylinder and ram units 142 are used. A single unit 144 is used between the carriage and the moving head 34. Unit 144 is somewhat larger than the other two units and is coupled to carriage 138 so that its cylinder 144a in fact extends through the carriage. The cylinders of the units 142 (denoted 142a) are mounted on opposite sides of cylinder 144a. Again, this is not essential and the cylinders could be mounted on the end stand 26.

In any event, as shown, the cylinder and ram unit 144 acts in opposition to the two units 142. While the sequence of actuation of the various units can vary, in general, the two units 142 displace the intermediate carriage 38 from the end stand 26. Unit 144 then further displaces the closing head with respect to the intermediate carriage. In this way, it is possible to obtain a long effective stroke (i.e. a long range of movement) of closing head 34 without the need to resort to expensive telescoping cylinder and ram arrangements.

It will of course be understood that the preceding description relates to a particular preferred embodiment of the invention and that many modifications are possible, some of which have been indicated previously and others of which will be apparent to a person skilled in the art.

In particular, various features of the invention that appear in the preferred embodiment can in fact be used independently of one another. For example, the multiple cylinder and ram arrangement disclosed for moving the closing head of the press can be used without the filter plate vibration feature and vice versa. Similarly, the filter plate vibration feature can be used without the travelling carriage 42 or the mechanism that has been disclosed for opening the filter plates in groups. For example, separate individual vibrator bars could be provided for different groups of plates, or a single bar for the whole stack of plates.

Different types of filter plates of course may be used; a recessed-plate type has been shown but membrane type plates are an alternative.

We claim:

1. A filter press for removing solids from a liquid stream, the press comprising:

a frame having first and second end members and a pair of generally horizontal side rails extending between said end members;

a series of filter plates;

means supporting said plates generally vertically on said side rails for movement along said rails;

press closure means operable to move the filter plates along said side rails to filtering positions in which the plates are compressed together as a pack, said press closure means being releasable to permit the filter plates to move along said side rails to cleaning positions in which at least some of the plates are separated from the remainder of the plates;

the filter plates in said filtering positions defining filter chambers between the plates in which said solids accumulate as filter cake when the press is in use;

inlet means for delivering said liquid stream to said filter chambers;

filtrate outlet means from said chambers;

wherein each said filter plate is generally planar, has opposite sides faces and top and bottom ends, and forms part of a filter plate assembly further comprising: a stop bar disposed generally in the plane of said filter plate and spaced from one of said ends of the plate, means biassing the filter plate away from said bar towards a rest position, and respective filter cloths extending over the side faces of the filter plate and each having a first end which is fixed with respect to the bar and a second end which is fixed with respect to the plate so that the filter cloth is under tension when the plate is in said rest position; and, means for simultaneously and repeatedly displacing at least a group of said filter plates that are in said cleaning positions towards the respective bars of said filter plate assemblies, the plates returning under the effect of said biassing means so that tension in the filter cloth is alternately relaxed and restored, for dislodging filter cake from the filter cloths.

2. A filter press as claimed in claim 1, wherein the stop bars of the filter plate assemblies are disposed above the respective plates, wherein each said assembly includes compression spring means between the stop bar and the plate comprising said means for biassing the plate away from the bar to said rest position, and wherein said means for simultaneously and repeated displacing the filter plates towards the bars comprises cam means operable to repeatedly lift said group of filter plates towards the respective bars and permit the plates to return under the influence of said compression springs.

3. A filter press as claimed in claim 2, wherein said means supporting each said filter plate on the side rails of the press frame comprises a pair of handles that project from opposite end edges of each filter plate and ride on the respective rails for permitting movement of the plates between said filtering positions and said cleaning positions, and wherein said cam means comprise respective cams disposed at opposite sides of the stack of filter plates below the respective handles, and rotatable in synchronism to simultaneously lift both handles of each filter plate for effecting said displacement of the filter plate towards and away from the associated stop bar, for vibrating the plate.

4. The filter press as claimed in claim 3, wherein each said cam is profiled to lift the filter plate handles to a peak position, and then abruptly allow the handle to drop under the effect of said compression springs, for producing an impact shock effect between the handles and the respective side rails, for assisting dislodgement of filter cake.

5. A filter press as claimed in claim 1, wherein each said filter cloth has a sleeve extending along each of said first and second ends of the cloth, and wherein each cloth is fixed with respect to the stop bar by a cloth retention member that extends through said sleeve at the first end of the cloth and is coupled to the bar, and wherein the cloth is fixed with respect to the plate at said second ends of the cloth by a hairpin rod that engages the respective second ends of both filter cloths at respective sides of the plate, the rod having parallel side limbs that extend through the sleeves at the second ends of both of said cloths.

6. A filter press as claimed in claim 1, wherein the filter press further comprises: a plate shifter carriage mounted on said side rails of the press frame for movement along said rails; drive means operable to move the carriage, the carriage including a shifter mechanism selectably engageable with a leading plate in a group of said plates to be separated for cleaning; and link means extending between the plates and adapted to permit successive plates in a said group to be drawn along with the leading plate at a spacing therefrom, so that successive groups of plates can be separated by engagement of the carriage with a leading said plate.

7. A filter press as claimed in claim 6, wherein each said plate has a pair of handles that project from opposite end edges of the plate and ride on said rails of the press frame, and wherein the shifter carriage includes respective said shifter mechanisms at opposite sides of the frame for simultaneous engagement with both handles of the said leading filter plate in each group.

8. A filter press as claimed in claim 7, wherein the stop bars of the filter plate assemblies are disposed above the respective plates, wherein each said assembly includes compression spring means between the stop bar and the plate for biassing the plate away from the bar to said rest position, and wherein said means for simultaneously and repeated displacing the filter plates towards the bars comprising cam means operable to repeatedly lift said group of filter plates towards the respective bars and permit the plates to return under the influence of said compression springs, said cam means comprising respective elongate cams carried by said carriage and disposed one at each side thereof for engaging the respective handles of said filter plates.

9. A filter press as claimed in claim 6, wherein the plate shifter carriage further includes water spray heads for washing the filter cloths of the filter plates when the plates are separated for cleaning removal.

10. A filter press as claimed in claim 1, wherein said press closure means comprises a closing head supported between said side rails of the frame for movement towards and away from said filter plates, for compressing the plates against a first one of said frame end members, an intermediate carriage supported between said side rails for movement along said rails between a second one of said frame end members and said closing head, and first and second cylinder and ram units, one coupled between said intermediate carriage and said closing head and the other coupled between said intermediate carriage and said second frame end member, for together permitting extended travel of said carriage with respect to said second end member.

11. A filter press as claimed in claim 10, wherein said first cylinder and ram unit includes a cylinder carried by said intermediate head and a ram coupled to said closing head, and wherein said second cylinder and ram unit comprises a pair of cylinder and ram units, each including a cylinder carried by said intermediate carriage, and a ram coupled to said second frame end member, said first cylinder and ram unit being disposed on a longitudinal center line of said intermediate carriage, and said pair of cylinder and ram units being disposed symmetrically and on opposite sides of said longitudinal center line.

12. A filter press as claimed in claim 11, wherein said cylinder of the first cylinder and ram unit is mounted on and extends through said intermediate carriage.

13. In a filter press which includes a generally horizontal series of vertical filter plates and means supporting said plates for movement between filtering positions in which the plates are compressed together as a pack, and cleaning positions in which at least some of the plates are separated from the remainder of the plates, the filter plates in said filtering position defining filter chambers between the plates in which solids accumulate as filter cake when the press is in use;

the improvement comprising:

each said filter plate being generally planar, having opposite side faces and top and bottom ends, and forming part of a filter plate assembly further comprising a stop bar disposed generally in the plane of said filter plate and spaced from one of said ends of the plate, means biassing the filter plate away from said bar towards a rest position, and respective filter cloths extending over the side faces of the filter plate and each having a first end which is fixed with respect to the bar and a second end which is fixed with respect to the plate so that the filter cloth is under tension when the plate is in said rest position; and, means for simultaneously and repeatedly displacing at least a group of said filter plates that are in said cleaning positions towards the respective bars of said filter plate assemblies, the plates returning under the effect of said biassing means so that tension in the filter cloth is alternately relaxed and restored, for dislodging filter cake from the filter cloths.

14. A filter press comprising:

a frame having first and second end members and a pair of generally horizontal side bars extending between said end members in horizontally spaced positions;

a series of filter plates;

means supporting said plates on said side bars in generally vertical orientation for movement between filtering positions in which the plates are compressed together as a pack, and positions in which at least some of the plates are separated from the remainder of the plates for removal of filter cake from the separated plates, the filter plates in said filtering positions defining filter chambers between the plates in which filter cake accumulates in use;

inlet means for delivering to said chambers a feed solution to be filtered;

filtrate outlet means from said chambers;

press closure means operable to maintain the filter plates in said filtering positions during filtration and releasable to permit at least some of the plates to be separated for removal of filter cake, said closure means comprising a closing head; means supporting said closing head between said side rails of the frame for movement towards and away from said filter plates, for compressing said plates against a first one of said frame end members, an intermediate carriage, means supporting said intermediate carriage between said side rails for movement along said rails between a second one of said frame end members and said closing head, and first and second cylinder and ram units, one coupled directly between said intermediate carriage and said closing head and the other coupled between said intermediate carriage and said second frame end member, for together permitting extended travel of said carriage with respect to said second end member, wherein said first cylinder and ram unit includes a cylinder carried by said intermediate head and a ram coupled to said closing head, and wherein said second cylinder and ram unit comprises a pair of cylinder and ram units, each including a cylinder carried by said intermediate carriage, and a ram coupled to said second frame end member, said first cylinder and ram unit being disposed on a longitudinal center line of said intermediate carriage, and said pair of cylinder and ram units being disposed symmetrically and on opposite sides of said longitudinal center line.

* * * * *